United States Patent Office 3,541,165
Patented Nov. 17, 1970

3,541,165
PROCESS FOR OBTAINING HALOGENATED FLUORINE-CONTAINING HYDROCARBONS
Martino Vecchio, Italo Cammarata, and Vittorio Fattore, Milan, Italy, assignors to Montecatini Edison S.p.A., Milan, Italy, a corporation of Italy
No Drawing. Continuation-in-part of application Ser. No. 329,402, Dec. 10, 1963. This application May 14, 1968, Ser. No. 728,927
Claims priority, application Italy, Dec. 28, 1962, 25,492/62
Int. Cl. C07c *17/02, 17/06*
U.S. Cl. 260—653.4                               11 Claims

ABSTRACT OF THE DISCLOSURE

Process for preparing fluorine-containing and chlorine-fluorine-containing derivatives of ethylene and ethane wherein a mixture of chlorine, hydrogen fluoride and ethylene or ethane are reacted together in the presence of recycled mixture of gaseous halo compounds (i.e. fluorinated, chlorinated and chloro-fluorinated hydrocarbons) having a maximum of two carbon atoms. The recycled mixture preferably consists at least in major part of $CCl_2=CCl_2$, $CF_2Cl-CCl_3$ or $CF_2Cl-CFCl_2$. The reaction is carried out in the presence of a catalyst in the solid state which is conducive to the chlorination-fluorination reaction, at a temperature in the range of about 300° to 600° C. and at a contact time in the range of about 0.1 to 30 seconds.

---

This application is a continuation-in-part of application Ser. No. 329,402, filed Dec. 10, 1963, now abandoned.

The present invention relates to a process for preparing halogenated, fluorine-containing hydrocarbons and, more particularly, to a process for obtaining these compounds by reacting together, in the presence of catalysts, aliphatic hydrocarbons having two carbon atoms, chlorine, and hydrofluoric acid (i.e. hydrogen fluoride).

Certain processes for preparing fluorinated or chloro-fluorinated compounds are carried out in liquid phase by boiling (under pressure and with refluxing) a mixture of hydrofluoric acid with a halogenated organic substance, in the presence of catalysts such as antimony halides.

Other processes are carried out in the vapor phase by passing a mixture of hydrofluoric acid and halogenated organic substance over catalysts which are generally based on fluorides of aluminum, chromium, zirconium or thorium.

A halogenation process for hydrocarbons containing two carbon atoms is also known wherein the hydrocarbons are reacted in gaseous phase with hydrogen fluoride, oxygen, chlorine and/or hydrogen chloride.

All these known processes, when used for producing fluorinated and chlorofluorinated compounds having two carbon atoms, employ halogenated organic compounds having two carbon atoms (such as perchloroethylene, trichloroethylene or hexachloroethane) as starting material.

These known processes have certain drawbacks and disadvantages. For instance, halogenated compounds must usually be employed as starting materials. Also, only low conversions and low yields of useful products are obtained. Moreover, some known processes can be thermally controlled only with difficulty, and others give very low reaction rates. In some cases (such as when the chlorofluorination of hydrocarbons is carried out in the presence of oxygen) water, which promotes the corrosion of the materials employed for the construction of the plant, is produced. Because of this, materials of particular chemical resistance must be used for the construction of the plant.

An object of the present invention is, in extending principles of the above-identified copending application, to provide an improved process for obtaining halogenated, fluorine-containing hydrocarbons.

A further object is that of providing a process which is carried out at such high reaction rates as to allow a high output per unit weight of catalyst.

Another object is to provide a process which does not possess the drawback of forming water, whereby corrosion of the materials employed for the construction of equipment are restricted to a remarkable extent, so that the apparatus may be constructed with materials of middling quality.

Another object is that of achieving a process affording ease of thermal control even for very high reaction rates.

Still a further object is that of providing a catalytic process for preparing halogenated fluorine-containing organic compounds which does not require frequent activation of the catalytic mass nor high-frequency periodic replacement of the same.

According to the present invention, halogenated fluorine-containing hydrocarbons, particularly chlorofluorinated hydrocarbons having two carbon atoms, are obtained by reacting upon solid fluorination and/or chlorination catalysts a gaseous mixture consisting of ethane or ethylene, hydrogen fluoride and chlorine, together with a mixture of halogenated hydrocarbons which seemingly do not take part in the reaction and are found again unaltered at the end of the process, at a temperature below about 600° C. with a catalyst-contact time of less than 30 seconds.

The mixture of halogenated hydrocarbons, introduced into the catalysis zone in admixture with the starting materials, is constituted of halogenated aliphatic hydrocarbons with one or two carbon atoms, and may include:

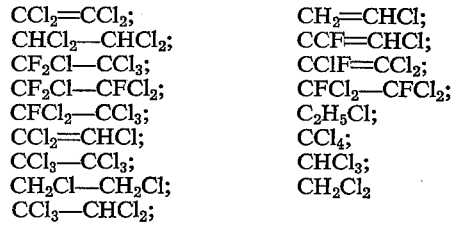

This list, however, has a purely indicative significance since many other compounds may be profitably employed. According to the present invention a mixture is preferably employed which is constituted of halogenated aliphatic hydrocarbons selected among the intermediates, by-products and products of the chlorofluorination reaction of ethane and ethylene.

The composition of the mixture of halogenated hydrocarbons (henceforth referred to as "recycling mixture") may be varied within wide limits, from either the qualitative or the quantitative viewpoint, that is considering either the individual halogenated hydrocarbons of which it is composed, or the proportion of each of them in the recycling mixture.

A preferred form of the present invention makes use, as recycling mixture, of the same mixture of halogenated aliphatic hydrocarbons which is obtained together with the main products in the chlorofluorination process. In some cases it is found profitable to add to the recycling mixture such inert gases as nitrogen or such reaction by-products as hydrochloric acid. The ratio of recycling mixture to reactants may also vary within a relatively wide range and depends on the reaction conditions and on the composition of the mixture of the products to be obtained.

When such halogenated hydrocarbons are to be preferentially obtained which contain fluorine and do not contain unsaturated bonds nor hydrogen atoms, for the ethylene the molar ratio chlorine/ethylene must be greater than about 2 and is preferably comprised between 4.8 and 5.2; for the ethane the molar ratio chlorine/ethane must be greater than 2 and preferably ranges between 5.8 and 6.2. Nevertheless, much higher ratios may be employed, as for instance 10, or 15.5.

When halogenated fluorine-containing hydrocarbons, which have unsaturated bonds and/or still contain hydrogen atoms, are desired, the molar ratio chlorine/ethylene must be less than or equal to 5, whereas for ethane the molar ratio chlorine/ethane must be less than or equal 5 to 6. The molar ratio of hydrogen fluoride to ethylene or ethane may vary within the range of 1 and 10, inclusive, depending on the products most desired among the ones theoretically obtainable.

The present invention may be carried out by mixing the products which are to be reacted together with the recycling mixture in any order; nevertheless we prefer mixing first the $C_2$ starting hydrocarbon together with hydrogen fluoride, adding then the recycling mixture and finally adding the chlorine.

Catalysts employed in carrying out the present invention are known and are generally constituted of oxides or salts (especially halides) of metals, which may be employed either alone or in mutual admixture and suitably supported on inert materials.

Particularly satisfactory results have been obtained by employing a catalyst on the basis of thorium tetrafluoride, as already disclosed and claimed in application Ser. No. 92,142 which was copending with the parent application but has since issued as U.S. Pat. 3,183,276. Catalysts to be employed in the process according to this invention may be activated by thermal treatment according to known techniques at temperatures comprised in the range between 350° C. and 700° C., preferably between 400° and 500° C., in the presence of air or of inert gases (e.g. nitrogen), or by thermal treatment at temperatures comprised between 200° and 600° C. in the presence of hydrogen fluoride and/or chlorine.

A particularly preferred alternative of the present invention is that of carrying out the reaction while adopting the technical expedient of dividing the catalyst into two distinct catalysis zones, as has been set forth in a commonly assigned earlier application Ser. No. 294,250, since issued as U.S. Pat. 3,294,852.

The process of the present invention is carried out at temperatures lower than 600° C., and preferably in the temperature range comprised between 300° and 500° C. The temperatures may be constant along the entire catalysis zone; however, it may be also nonuniform as for instance in the case where the process is carried out in two catalysis zones operating at different temperatures.

The pressure at which the process is carried out may be varied within a very wide range from atmospheric pressure to superatmospheric pressures of up to 15 atmospheres. The contact time (i.e. the time during which the gaseous mixture remains in the presence of the catalyst) may vary with the nature of the products to be obtained. In fact it has been ascertained that long contact times yield products with greater fluorination. In carrying out the present invention, use is made of contact times lower than 30 seconds and preferably comprised between 4 and 10 seconds.

The products obtainable according to the process of the present invention are halogenated aliphatic hydrocarbons with two carbon atoms, such as $CF_2Cl$—$CF_2Cl$; $CF_2Cl$—$CFCl_2$; $CF_2Cl$—$CCl_3$; $CFCl_2$—$CFCl_2$; $C_2FCl_5$.

It is also possible, by varying some parameters such as temperature, contact time, molar ratios of the fed gaseous mixture and the recycling-mixture composition, to direct the reaction prevailingly towards a given halogenated compound or towards a predetermined mixture of halogenated compounds.

According to a theory, to which we do not wish to be limited, the recycling mixture acts as an inert diluent towards the mixture of reactant products and allows a more easy control, from the thermal point of view, of the chlorofluorination reaction. The advantage deriving from employment of said recycling mixture is displayed also with regard to the surprisingly increased yields of the desired products.

Thus the advantages originating from employment of a recycling mixture would show themselves chiefly under two aspects, the first relating to a greater possibility of thermally controlling the process; the second relates to a remarkable increase of the yields in useful products.

The following examples, whose purpose is that of illustrating more clearly the inventive concept of the present invention, report some operative modalities whereto however a number of variations could be applied without departing from the inventive concept of the present invention.

EXAMPLE 1

An air stream is passed during 2 hrs. over activated alumina (commercially known as Alcoa F–10) kept at 500° C.

Then, while keeping the temperature at 300° C., the alumina is treated with a stream of hydrogen fluoride to complete saturation (2–6 hrs.); finally the fluorinated alumina is subjected to grinding and sieving to collect the fraction with a particle size between 100 and 150 mesh. This fraction is impregnated with an aqueous solution of thorium tetrachloride monohydrate at 75% by weight and finally is subjected to drying.

650 ml. of the alumina/thorium tetrachloride product is charged into a reactor of the type suitable for carrying out catalytic reactions according to socalled "fluidized bed" technique.

A gaseous mixture, constituted of chlorine, hydrogen fluoride, ethylene and a mixture of recycling halogenated hydrocarbons, in the following molar ratios:

| | Moles |
|---|---|
| Chlorine | 5.2 |
| Hydrogen fluoride | 4.8 |
| Ethylene | 1 |
| Mixture of recycling halogenated hydrocarbons | 6 | is passed through the catalytic mass.

The mixture of recycling halogenated hydrocarbons has the following molar composition:

| | Mole percent |
|---|---|
| $CCl_3$—$CCl_3$ | 1.0 |
| $CCl_2$=$CCl_2$ | 31.1 |
| $CHCl_2$—$CCl_3$ | 0.1 |
| $CHCl$=$CCl_2$ | 0.8 |
| $CFCl$=$CCl_2$ | 0.4 |
| $CFCl_2$—$CCl_3$ | 1.9 |
| $CF_2Cl$—$CCl_3$ | 24.7 |
| $CF_2Cl$—$CFCl_2$ | 39.5 |
| $CF_2Cl$—$CF_2Cl$ | 0.2 |

Temperature is kept at about 470° C. The gases remain in the catalysis zone for 4 seconds. The gaseous mixture leaving the reactor is conveyed to a stripping tower whose top is cooled by means of a mixture of trichloroethylene/Dry Ice.

From the bottom of the tower a mixture of halogenated hydrocarbons is extracted which, after evaporation, constitutes the recycle mixture of halogenated hydrocarbons which is fed to the reactor together with the products to be reacted.

The gaseous mixture which emerges from the top of the tower contains the reaction products and by-products. It is subjected to washing firstly with water, then with aqueous 5% solutions of sodium hydroxide; the scrubbed gases are then condensed and analyzed by chromatography in gaseous phase.

The following conversions are obtained:

| | Percent |
|---|---|
| Ethylene | 100 |
| Hydrogen fluoride | 82 |
| Chlorine | 96 |

Yields of chlorofluorinated products, calculated with respect to ethylene, are as follows:

| | Percent |
|---|---|
| $CF_2Cl-CF_2Cl$ | 95.6 |
| $CF_2Cl-CFCl_2$ | 1.3 |
| $CF_3-CF_2Cl$ | 1.0 |
| $CF_2Cl_2$ | 0.1 |
| $CF_3Cl$ | 1.3 |
| $CHF_3$ | 0.3 |

EXAMPLE 2

This example is carried out in the same reactor, under the same conditions and with the same catalyst as described in Example 1.

Through 675 ml. of the catalyst, with a particle size between 100 and 150 mesh, a gaseous mixture constituted as follows is passed:

| | Moles |
|---|---|
| Chlorine | 5.3 |
| Hydrogen fluoride | 3.7 |
| Ethylene | 1 |
| Mixture of recycling halogenated hydrocarbons | 5.8 |

The recycling mixture shows the following molar composition:

| | Mole percent |
|---|---|
| $CF_2-CFCl_2$ | 12.0 |
| $CF_2Cl-CCl_3$ | 30.2 |
| $CCl_2=CHCl$ | 0.4 |
| $CCl_2=CCl_2$ | 49.9 |
| $CFCl_2-CCl_3$ | 4.9 |
| $CCl_3-CCl_3$ | 0.6 |

The reaction temperature is kept at 455° C. and the contact time is 4 seconds.

Separation of recycling mixture, isolation, purification and examination of products are performed as in Example 1.

The following conversions are obtained:

| | Percent |
|---|---|
| Ethylene | 100 |
| Hydrogen fluoride | 85 |
| Chlorine | 95 |

The yields of chlorofluorinated products, calculated with respect to ethylene, are the following:

| | Percent |
|---|---|
| $CF_2Cl-CFCl_2$ | 81.0 |
| $CF_2Cl-CF_2Cl$ | 15.7 |
| $CF_3-CF_2Cl$ | 0.4 |
| $CF_2Cl_2$ | 0.9 |
| $CF_3Cl$ | 1.2 |

EXAMPLE 3

The reaction is carried out as set forth in the preceding examples. The mixture of reactant gases has the following composition:

| | Moles |
|---|---|
| Chlorine | 5.2 |
| Hydrogen fluoride | 4.2 |
| Ethylene | 1 |
| Mixture of recycling halogenated hydrocarbons | 6.1 |

The composition of recycling mixture is as follows:

| | Mole percent |
|---|---|
| $CCl_3-CCl_3$ | 1.6 |
| $CCl_2=CCl_2$ | 42.1 |
| $CHCl_2-CCl_3$ | 0.2 |
| $CHCl=CCl_2$ | 1.2 |
| $CFCl=CCl_2$ | 0.3 |
| $CFCl_2-CCl_3$ | 2.1 |
| $CF_2Cl-CCl_3$ | 27.1 |
| $CF_2Cl-CFCl_2$ | 24.9 |
| $CF_2Cl-CF_2Cl$ | 0.1 |

The reaction temperature is 450° C.; the contact time 4 seconds.

The following conversions are obtained:

| | Percent |
|---|---|
| Ethylene | 100 |
| Hydrogen fluoride | 83 |
| Chlorine | 96 |

The yields of chlorofluorinated derivatives, calculated with respect to ethylene, are the following:

| | Percent |
|---|---|
| $CF_2Cl-CF_2Cl$ | 46.3 |
| $CF_2Cl-CFCl_2$ | 50.9 |
| $CF_3-CF_2Cl$ | 0.6 |
| $CF_2Cl_2$ | 0.2 |
| $CF_3Cl$ | 1.2 |

In the following Examples 4–10, the reaction was carried out according to fluidized-bed technique in a single reaction zone.

Temperatures, contact time, molar ratios of the raw materials, molar quantities and weight composition of the recycling mixture and product yields and conversions are listed in Table I.

EXAMPLE 4

600 ml. of a catalyst consisting of black chromium oxide, having a size comprised between 42 and 325 mesh, was activated by heating in an air stream at 500° C. and treated with a stream of hydrogen fluoride at 500° C.

EXAMPLE 5

600 ml. of catalyst consisting of alumina impregnated with $CuCl_2$ having a size between 42 and 325 mesh was activated by heating under nitrogen atmosphere at 500° C. and treated with a stream of hydrogen fluoride at 500° C. The composition by weight of the catalyst was the following (after drying at 110° C. but before activation and fluorination):

| | Percent |
|---|---|
| $Al_2O_3$ | 90 |
| $CuCl_2$ | 10 |

EXAMPLE 6

600 ml. of a catalyst consisting of alumina impregnated with $CoCl_2$ having a size between 42 and 325 mesh was activated by heating in an air stream at 500° C. and fluorinated with hydrogen fluoride at 500° C. The composition by weight of the catalyst was the following (after drying at 110° C. but before activation and fluorination):

| | Percent |
|---|---|
| $CoCl_2$ | 10 |
| Alumina | 90 |

EXAMPLE 7

The catalyst used in this experiment consisted of 500 ml. of fluorinated alumina having a size between 42 and 325 mesh activated by heating in an air stream at 500° C. and fluorinated with hydrogen fluoride at 500° C.

EXAMPLE 8

135 ml. of a catalyst consisting of fluorinated alumina (size 28–150 mesh) was activated under a nitrogen atmosphere at 750° C. and fluorinated with hydrogen fluoride at 750° C.

EXAMPLE 9

The catalyst used in this example consisted of 670 ml. of spheroidal $Cr_2O_3$ activated by heating in an air stream at 420° C. and activated with hydrogen fluoride at 420° C.

EXAMPLE 10

The catalyst used in this example, consisted of 590 ml. of alumina impregnated with 9.5% of $Zr(NO_3)_4$ and activated by heating at 550° C. for 2 hours under a stream of air and then fluorinated at 500° C. with hydrogen fluoride.

In Examples 11–16 (infra) the reaction was carried out in two reaction zones maintained at different temperatures. In Examples 11–14 the first zone consisted of a reactor of suitable type for carrying out catalytic reactions by the fluidized-bed technique; in the second zone, the catalytic reactions were carried out by the fixed-bed technique.

In Examples 15 and 16 the reaction was carried out by the fluidized-bed technique in two zones.

The temperatures and the contact times of the two zones, the molar ratios of the raw materials, the molar quantities and molar composition of the recycling mixture (fed to the first zone) and the product yields and conversions are listed in Table II.

EXAMPLE 11

The catalyst used in the first zone consisted of 600 cc. of fluorinated alumina, exhausted after a long running period, having a size comprised between 42 and 325 mesh.

In the second zone was used 180 cc. of active alumina impregnated with chromium chloride. The composition by weight of the catalyst was the following (after drying at 110° C. but before activation and fluorination):

| | Percent |
|---|---|
| $Al_2O_3$ | 95 |
| $CrCl_3$ | 5 |

This catalyst, having a particle size of 6 mm., was activated in nitrogen atmosphere and fluorinated with hydrogen fluoride at 350° C.

EXAMPLE 12

The reaction was carried out using in the first zone as catalyst 570 cc. of fluorinated alumina exhausted after a long running period, having a size comprised between 60 and 275 mesh; in the second zone was used as catalyst 170 cc. of active alumina impregnated with chromium chloride. This catalyst, having a size of 6 mm. was activated in nitrogen atmosphere and fluorinated with hydrogen fluoride at 370° C. The composition by weight of the catalyst was the following:

| | Percent |
|---|---|
| $Al_2O_3$ | 95 |
| $CrCl_3$ | 5 |

EXAMPLE 13

In this experiment the first- and second-zone quantities and catalysts are similar to those in Example 12. The catalyst used in the second zone was activated in a nitrogen atmosphere at 370° C. and fluorinated with hydrogen fluoride at 420° C.

EXAMPLE 14

Two reaction zones were used with the same quantities and the same catalysts as used in Examples 12 and 13. The catalyst used in the second zone was activated in a nitrogen atmosphere at 370° C. and fluorinated with hydrogen fluoride at 470° C.

EXAMPLE 15

The catalyst used in the first zone consisted of 740 cc. of fluorinated alumina, exhausted after a long running period, having a size comprised between 42 and 325 mesh. In the second zone 440 cc. of chromium oxide having a size comprised between 28 and 80 mesh was used.

EXAMPLE 16

The reaction was carried out using in the first zone, as catalyst, 470 cc. of fluorinated alumina exhausted after a long running period, having a size comprised between 42 and 325 mesh; in the second zone was used as catalyst 440 cc. of chromium oxide having a size comprised between 28 and 80 mesh.

In the next two examples (17 and 18) ethane has been used as starting material.

EXAMPLE 17

Gamma-alumina was activated by heating in air at 500° C. for 2 hours and then fluorinated with hydrogen fluoride at 450° C. 670 cc. of the so obtained fluorinated alumina having a size comprised between 42 and 325 mesh were charged into a reactor of the type suitable for carrying out catalytic reactions according to fluidized-bed technique. While maintaining the reactor at 400° C. a gaseous mixture consisting of chlorine, hydrogen fluoride, ethane and a mixture of recycling halogenated hydrocarbon was passed through the catalyst.

The molar ratios among the reactants were as follows:

| | Moles |
|---|---|
| Chlorine | 6.0 |
| Hydrogen fluoride | 3.9 |
| Ethane | 1 |
| Mixture of halogenated hydrocarbons | 5.9 |

The mixture of recycling halogenated hydrocarbons had the following molar composition:

| | Mole percent |
|---|---|
| $C_2F_3Cl_3$ | 58.0 |
| $C_2F_2Cl_4$ | 13.3 |
| $C_2FCl_5$ | 2.1 |
| $C_2HCl_5$ | 1.8 |
| $C_2HCl_3$ | 1.2 |
| $C_2Cl_4$ | 20.4 |
| $C_2Cl_6$ | 0.7 |

The contact time was 5.3 sec. The gaseous mixture leaving the reactor was conveyed to a stripping tower the top of which was cooled by means of a trichloroethylene/Dry-Ice mixture. From the bottom of the tower a mixture of halogenated hydrocarbons was taken off which, after evaporation, constituted the mixture of halogenated hydrocarbons which was fed to the reactor together with other reactants.

The gaseous mixture leaving the top of the tower contained the reaction products and by-products.

It was subjected to washing first with water then with an aqueous 5% solution of sodium hydroxide and then it was condensed and analyzed by gas-phase chromatography.

The following conversions were obtained:

| | Percent |
|---|---|
| Hydrogen fluoride | 68.2 |
| Chlorine | 98.5 |
| Ethane | 99.8 |

The yields of chlorofluorinated products calculated with reference to the converted ethane were as follows:

| | Percent |
|---|---|
| $C_2F_5Cl$ | 2.4 |
| $C_2F_4Cl_2$ | 36.0 |
| $C_2F_3Cl_3$ | 35.3 |

EXAMPLE 18

The same reactor and reaction conditions as described in Example 17 were used. Chromium sesquioxide ($Cr_2O_3$) deposited on alumina and having the composition by weight of 5% $Cr_2O_3$ and 95% $Al_2O_3$ was activated at 500° C. in the presence of air and then fluorinated at 380° C. with hydrogen fluoride.

The reaction temperature was 350° C. and the contact time was 5.2 sec.

The molar ratios among the reactants were as follows:

| | Moles |
|---|---|
| Chlorine | 6.4 |
| Hydrogen fluoride | 4.1 |
| Ethane | 1 |
| Mixture of recycling halogenated hydrocarbons | 5.5 |

The composition of the recycling mixture was as follows:

| | Mole percent |
|---|---|
| $C_2F_4Cl_2$ | 0.3 |
| $C_2F_3Cl_3$ | 26.4 |
| $C_2F_2Cl_4$ | 21.5 |
| $C_2FCl_5$ | 10.1 |
| $C_2HCl_3$ | 2.0 |
| $C_2Cl_4$ | 26.6 |
| $C_2Cl_6$ | 7.1 |

The following conversions were obtained:

| | Percent |
|---|---|
| Hydrogen fluoride | 69.8 |
| Chlorine | 90 |
| Ethane | 99 |

The yields of chlorofluorinated products calculated with reference to the converted ethane were as follows:

| | Percent |
|---|---|
| $C_2F_5Cl$ | 3.6 |
| $C_2F_4Cl_2$ | 21.2 |
| $C_2F_3Cl_3$ | 57.3 |

EXAMPLES 19–25

The catalyst used in these examples was alumina activated by heat treatment at 500° C. for 1 hour under a stream of air and then fluorinated at 420° C. with hydrogen fluoride.

1750 g. of hydrogen fluoride were used for 1000 g. of alumina.

Reaction conditions and results are collected in the attached Tables III and IV.

EXAMPLE 26

1160 g. of alumina (sold by the firm Ketjen as grade B) were impregnated with 410 cc. of an aqueous solution containing 148.5 g. of $CrCl_3 \cdot 6H_2O$. After two hours the resulting mass was dried under vacuum at 110° C. for 14 hours.

The product had a Cr content of 26.5%. In an Inconel fluidized-bed reactor the catalyst was activated by heat treatment under a stream of air at 500° C. for 30 minutes and fluorinated under a stream of hydrogen fluoride at 370° C. 1830 g. of hydrogen fluoride was used.

The catalyst was charged into a fluidized-bed reactor and a gaseous mixture consisting of ethylene, chlorine, hydrogen fluoride and a recycle mixture of halogenated hydrocarbons was passed therethrough. The molar ratios of the components of the gaseous mixture were as follows:

| | Mol percent |
|---|---|
| Chlorine | 5 |
| Hydrogen fluoride | 4.0 |
| Ethylene | 1 |
| Recycling mixture of halogenated hydrocarbons | 6 |

The recycling mixture had the following weight composition:

| | Percent |
|---|---|
| $C_2Cl_2F_4$ | 0.1 |
| $CCl_2F=CClF_2$ | 11.0 |
| $CCl_3$—$CF_3$ | 4.0 |
| $C_2HF_3$ | 0.8 |
| $C_2Cl_3F$ | 2.1 |
| $C_2F_2Cl_4$ | 22.8 |
| $C_2Cl_4$ | 52.6 |
| $C_2FCl_5$ | 4.7 |
| $C_2Cl_6$ | 1.2 |
| Not identified | 0.7 |

The reaction temperature was 350° C. and the contact time was 3 seconds.

The following conversions were obtained

| | Percent |
|---|---|
| Ethylene | 100 |
| Hydrogen fluoride | 80 |
| Chlorine | 98 |

The yields calculated with reference to the converted ethylene were as follows:

| | Percent |
|---|---|
| $CClF_2$—$CClF_2$ | 5 |
| $CCl_2F$—$CF_3$ | 11 |
| $CCl_3$—$CF_3$ | 24 |
| $CClF_2$—$CCl_2F$ | 60 |

TABLE I

| Example No. | Temp., °C. | Contact time, sec. | Molar ratios Rec. mixture, $C_2H_4$ | $Cl_2/C_2H_4$ | $HF/C_2H_4$ | Composition of the recycling mixture, percent mole $C_2F_3Cl_3$ | $C_2F_2Cl_4$ | $C_2FCl_5$ | $C_2F_4Cl_2$ | $C_2Cl_4$ | $C_2Cl_6$ | CO | $C_2F_6Cl$ | $CF_3Cl$ | Product yields with respect to converted ethylene, percent $C_2F_4Cl_2$ | $C_2F_3Cl_3$ | $CF_2Cl_2$ | $CFCl_3$ | Conversions of the reactants, percent $C_2H_4$ | $Cl_2$ | HF |
|---|---|---|---|---|---|---|---|---|---|---|---|---|---|---|---|---|---|---|---|---|---|
| 4 | 470 | 4.2 | 4.2 | 5.5 | 5.1 | 31.1 | 26.9 | 4.8 | 0.8 | 29.8 | 2.8 | 0.9 | 14.8 | 1.4 | 76.6 | — | — | — | 100 | 91.5 | 79.4 |
| 5 | 450 | 4.6 | 4.4 | 5.5 | 5.1 | 53.8 | 10.1 | 1.8 | 0.6 | 25.8 | 2.1 | 0.4 | 6.2 | 0.1 | 75.0 | — | — | — | 99.8 | 94.9 | 47.7 |
| 6 | 470 | 4.4 | 4.2 | 5.3 | 4.8 | 47.5 | 13.5 | 4.5 | — | 26.9 | 1.5 | 0.7 | 0.1 | 0.3 | 9.6 | 10.8 | — | — | 99.5 | 96.3 | 79 |
| 7 | 470 | 3.5 | 15.4 | 5.3 | 4.2 | 41.8 | 25.8 | 4.0 | 0.6 | 21.6 | 2.5 | — | 2.4 | 0.4 | 91.6 | 77.3 | — | — | 99.9 | 97.6 | 52.8 |
| 8 | 600 | 5.6 | — | 5.5 | 6.1 | 37.9 | 8.3 | 6.5 | 0.1 | 39.8 | 0.6 | 0.1 | — | 0.4 | 47.7 | 31.3 | 21.2 | — | 100 | 89.9 | 49.7 |
| 9 | 400 | 5.3 | 4.1 | 5.0 | 3.9 | 88 | 30.5 | 7.5 | 0.3 | 28 | 2.1 | 0.6 | 3.7 | 0.9 | 51.4 | — | — | — | 100 | 98.7 | 90.3 |
| 10 | 470 | 3.5 | 4.0 | 5.0 | 4.5 | 24.2 | 27.0 | 1.0 | 0.6 | 44.0 | 2.3 | — | 12.2 | 0.3 | 48.3 | 34.8 | — | 27.0 | 100 | 99.9 | 79.1 |

TABLE II

| Example No. | First reaction zone Temp., °C. | Contact time, sec. | Second reaction zone Temp., °C. | Contact time, sec. | Molar ratios Rec. mixture, $C_2H_4$ | $Cl_2/C_2H_4$ | $HF/C_2H_4$ | Composition of the recycling mixture $C_2F_3Cl_3$ | $C_2F_2Cl_4$ | $C_2FCl_5$ | $C_2Cl_4$ | $C_2Cl_6$ | $C_2Cl_3F$ | Product yields with respect to the converted ethylene, percent $C_2F_5Cl$ | $CF_3Cl$ | $C_2F_4Cl_2$ | $C_2F_3Cl_3$ | Conversion of the reactants, percent $C_2H_4$ | $Cl_2$ | HF |
|---|---|---|---|---|---|---|---|---|---|---|---|---|---|---|---|---|---|---|---|---|
| 11 | 470 | 4.5 | 325 | 1¾⁄10 | .4 | 5.5 | 7.5 | 50.5 | 14.2 | 3.9 | 26.8 | 1.2 | 1.1 | 1.8 | 0.1 | 16.7 | 76.2 | 100 | 90.5 | 41.7 |
| 12 | 470 | 4.6 | 350 | 1⅞⁄10 | 3.1 | 5.3 | 6.4 | 41.7 | 19.4 | 5.2 | 29.4 | 1.9 | 1.9 | 3.3 | 0.2 | 50.0 | 45.3 | 100 | 92.9 | 55.3 |
| 13 | 470 | 4.6 | 400 | 1⅗⁄10 | 2.9 | 5.3 | 4.5 | 37.5 | 23.1 | 5.3 | 27.6 | 1.4 | 4.4 | 4.9 | 0.7 | 47.1 | 43.9 | 100 | 96.3 | 71 |
| 14 | 470 | 3.5 | 450 | 1⅘⁄10 | 3.1 | 5.3 | 4.6 | 37.6 | 25.5 | 4.5 | 25.5 | 0.6 | 4.6 | 9.8 | 0.7 | 51.7 | 30.2 | 100 | 93.5 | 76.6 |
| 15 | 250 | 9.3 | 400 | 4⅗⁄10 | 4 | 4.9 | 5 | 25.6 | 23.5 | 4.1 | 42.1 | 2.1 | 1.9 | — | 0.2 | 50.9 | 44.2 | 100 | 99.7 | 74.2 |
| 16 | 250 | 6.2 | 450 | 4⅗⁄10 | 4.2 | 4.5 | 4.2 | 25.6 | 19.5 | 3.9 | 43.2 | 2.3 | 0.5 | 1.1 | 0.1 | 53.3 | 42.4 | 100 | 99.6 | 84.2 |

TABLE III

| Example No. | Temp., °C. | Contact time, sec. | Molar ratios Rec. mixture/C₂H₄ | Molar ratios Cl₂/C₂H₄ | Molar ratios HF/C₂H₄ | Composition of the recycling mixture, percent mole C₂F₃Cl₃ | C₂F₂Cl₄ | C₂FCl₅ | C₂F₂Cl₂ | C₂Cl₄ | C₂Cl₆ | C₂Cl₃F | Product yields with respect to converted ethylene, percent CO | C₂F₃Cl | C₂F₄Cl₂ | C₂F₃Cl₃ | Conversion of the reactants, percent C₂H₄ | Cl₂ | HF |
|---|---|---|---|---|---|---|---|---|---|---|---|---|---|---|---|---|---|---|---|
| 19 | 400 | 2.95 | 5.84 | 4.93 | 4.07 | 1.7 | 21.2 | 8.1 | ---- | 64.4 | 2.9 | 1.1 | 0.13 | ---- | ---- | 9.9 | 88.55 | 99.9 | 99.7 | 79.4 |
| 20 | 400 | 3.01 | 5.98 | 4.92 | 4.82 | 12.4 | 42.6 | 16.4 | ---- | 24.0 | 2.3 | 0.6 | ---- | ---- | ---- | 12.8 | 85.4 | 100 | 99.0 | 66.4 |
| 21 | 400 | 3.02 | 6.10 | 4.33 | 4.78 | 42.3 | 36.8 | 6.9 | 0.2 | 12.1 | 1.3 | 0.3 | ---- | 0.1 | ---- | 28.0 | 72.0 | 100 | 92.9 | 69.4 |
| 22 | 400 | 2.98 | 6.09 | 5.89 | 4.95 | 35.2 | 43.2 | 7.0 | 0.4 | 12.4 | 1.5 | 0.3 | ---- | 0.1 | ---- | 30.2 | 69.7 | 100 | 85 | 66.2 |

TABLE IV

| Example No. | Temp., °C. | Pressure atm. (abs.) | Contact time, sec. | Molar ratios Recycle/C₂H₄ | Molar ratios Cl₂/C₂H₄ | Molar ratios HF/C₂H₄ | Composition of the recycling mixture percent by weight C₂Cl₃F₄ | CCl₃-CF₃ | CCl₂F-CClF₂ | C₂H₄-Cl₂ | C₂-Cl₂F | C₂-HCl₃ | C₂F₄-Cl₂ | C₂Cl₄ | C₂-FCl₅ | C₂Cl₆ | Product yields with respect to converted ethylene C₂-ClF₅ | C₂F₄-Cl | CClF₂-CClF₂ | CClF₂-CF₃ | CF₂-CCl₃ | CCl₂F-CCl₂F | Conversions of the reactants C₂H₄ | Cl₂ | HF |
|---|---|---|---|---|---|---|---|---|---|---|---|---|---|---|---|---|---|---|---|---|---|---|---|---|
| 23 | 400 | 2 | 6 | 9.7 | 5.1 | 4.1 | 0.23 | 11 | 12 | 0.02 | 0.23 | 0.78 | 27.65 | 29.48 | 11.46 | 6.21 | 0.94 | 1.9 | 51 | ---- | 10 | 17 | 18 | 100 | 98 | 91 |
| 24 | 380 | 1 | 2.9 | 10 | 5.1 | 4.5 | 0.8 | 16 | 17 | 0 | 0.9 | 2.2 | 14.5 | 40.5 | 4.4 | 2.7 | 1.0 | 0.5 | 68 | ---- | 10 | 10 | 11 | 100 | 98 | 85 |
| 25 | 360 | 1 | 6 | 10 | 5.1 | 4.9 | 0 | 0.8 | 3 | 0 | 0 | 2.2 | 29.6 | 50.4 | 11.0 | 3.2 | Not identified | ---- | 6 | ---- | 0.7 | 29 | 64 | 100 | 98 | 60 |

We claim:

1. A process for preparing fluorine-containing and chlorine-fluorine-containing derivatives of ethylene or ethane which comprises reacting a mixture of chlorine, hydrogen fluoride and ethylene, together with a mixture of compounds in the gaseous state selected from the group consisting of fluorinated, chlorinated and chloro-fluorinated hydrocarbons having a maximum of two carbon atoms and derived from chlorofluorination reaction of ethylene or ethane with $Cl_2$ and HF, in the presence of a catalyst in the solid state which is conducive to the chlorination-fluorination reaction, at a temperature in the range of about 300° to 600° C. and with a contact time in the range of about 0.1 to 30 seconds.

2. The process defined in claim 1 wherein the catalyst is fluorinated alumina impregnated with thorium tetrafluoride.

3. The process defined in claim 1 wherein the reaction temperature is between about 300° C. and about 500° C. and the contact time between about 4 and about 10 seconds.

4. The process defined in claim 1 wherein said chlorine, said hydrogen fluoride and said ethylene, together with said mixture of compounds in the gaseous state, are passed through at least two distinct catalysis zones.

5. The process defined in claim 1 wherein said mixture of compounds in the gaseous state is continuously separated from the reaction mass and introduced into the reaction medium together with the compounds to be reacted.

6. A process for preparing fluorine-containing and chlorine-fluorine-containing derivatives of ethylene and ethane which comprises reacting a mixture of chlorine, hydrogen fluoride and a compound selected from the group consisting of ethylene and ethane, together with a recycled mixture of compounds in the gaseous state selected from the group consisting of fluorinated, chlorinated and chlorofluorinated hydrocarbons having a maximum of two carbon atoms and derived from chlorofluorination reaction of ethylene or ethane with $Cl_2$ and HF, said mixture consisting at least in major part of at least one compound from the group of $CCl_2=CCl_2$, $CF_2Cl-CCl_3$ and $CF_2Cl-CFCl_2$, in the presence of a catalyst in the solid state which is conducive to the chlorination-fluorination reaction, at a temperature in the range of about 300° to 600° C. and at a contact time in the range of about 0.1 to 30 seconds.

7. The process defined in claim 6 wherein the molar ratio of said recycled mixture of compounds to said compound from the group of ethylene and ethane ranges between substantially 2.9 and 15.5; said temperature ranges between 300° C. and 500° C.; the catalyst contact time ranges between about 4 and 10 seconds; the molar ratio of chlorine to said compound from the group of ethylene and ethane ranges between substantially 2 and 10; and the molar ratio of hydrogen fluoride to said compound from the group of ethylene and ethane ranges between 1 and 10.

8. The process defined in claim 7 wherein said catalyst is alumina, chromium oxide or chromium chloride treated at a temperature between substantially 200° C. and 600° C. with hydrogen fluoride.

9. The process defined in claim 7 wherein the reaction is carried out in at least two successive reaction zones operated at different temperatures, at least the second zone being maintained at a temperature in the range of 300° C. to 500° C.

10. The process defined in claim 7 wherein the reaction is carried out at atmospheric pressure.

11. The process defined in claim 7 wherein the reaction is carried out at a superatmospheric pressure.

(References on following page)

References Cited

UNITED STATES PATENTS

| | | | |
|---|---|---|---|
| 2,407,129 | 9/1946 | Benning et al. | 260—653.7 |
| 2,755,313 | 7/1956 | Calfee | 260—653.6 |
| 2,946,827 | 7/1960 | Belf | 260—653.7 |
| 3,183,276 | 5/1965 | Vecchio | 260—653.7 |
| 2,946,828 | 7/1960 | Scherer et al. | 260—653.7 |

FOREIGN PATENTS

| | | |
|---|---|---|
| 745,818 | 3/1956 | Great Britain. |
| 640,486 | 7/1950 | Great Britain. |

DANIEL D. HORWITZ, Primary Examiner

U.S. Cl. X.R.

260—653.6, 653.7, 654, 659